(12) United States Patent
Gupta et al.

(10) Patent No.: US 8,488,852 B2
(45) Date of Patent: Jul. 16, 2013

(54) MEDICAL IMAGING SYSTEM FOR SEGEMENTING BLOOD VESSEL

(75) Inventors: Vipin Gupta, Bangalore (IN); Amit Kale, Bangalore (IN); Hari Sundar, Piscataway, NJ (US)

(73) Assignee: Siemens Aktiengesellschaft, München (DE)

( * ) Notice: Subject to any disclaimer, the term of this patent is extended or adjusted under 35 U.S.C. 154(b) by 246 days.

(21) Appl. No.: 13/027,460

(22) Filed: Feb. 15, 2011

(65) Prior Publication Data

US 2012/0207378 A1    Aug. 16, 2012

(51) Int. Cl.
*G06K 9/00* (2006.01)
(52) U.S. Cl.
USPC .......................................................... 382/128
(58) Field of Classification Search
None
See application file for complete search history.

(56) References Cited

U.S. PATENT DOCUMENTS

| 7,180,976 B2 | 2/2007 | Wink et al. |
| 2003/0053697 A1 | 3/2003 | Aylward et al. |
| 2009/0003511 A1 | 1/2009 | Roy et al. |

FOREIGN PATENT DOCUMENTS

JP    2003164445 A    6/2003

OTHER PUBLICATIONS

Matthias Schneider and Hari Sundar, "Automatic Global Vessel Segmentation and Catheter Removal Using Local Geometry Information and Vector Field Integration", IEEE 2010, NL, pp. 45-48.*
Alejandro F. Frangi, Wiro J. Niessen, Koen L. Vincken, Max A. Viergever, "Multiscale vessel enhancement filtering", 1998, Medical Image Computing and Computer-Assisted Intervention—MICCAI ,98, W.M. Wells, A. Colchester and S.L. Delp (Eds), Lecture Notes in Computer Science, vol. 1496—Springer-Verlag, Berlin, Germany, pp. 130-137.
Eberhard Hansis, Dirk Schäfer, Olaf Dössel and Michael Grass, Automatic optimum phase point selection based on centerline consistency for 3D rotational coronary angiography, Interntational Journal of Computer Assisted Radiology and Surgery, vol. 3, Nos. 3-4, 355-361, 2008.
Uwe Jandt, Dirk Schäfer, Michael Grass and Volker Rasche, Automatic generation of time resolved motion vector fields of coronary arteries and 4D surface extraction using rotational x-ray angiography, Physics in Medicine and Biology, vol. 54, No. 1, Dec. 8, 2008.

* cited by examiner

*Primary Examiner* — Atiba O Fitzpatrick

(57) ABSTRACT

A medical imaging system to segment an original blood vessel of a body part represented by an original medical image is provided. The system includes an image analyzer for receiving and the original medical image to analyze the original medical image to provide a Hessian Eigen analysis comprising a first data and a second data mapped to each pixel of the medical image, and an image identifier for receiving the Hessian Eigen analysis and for identifying seed points from the pixels by processing the first data and the second data along with a vesselness property, wherein the seed points are used for segmenting the original blood vessel to provide a corrected medical image representing a corrected blood vessel.

14 Claims, 4 Drawing Sheets

MEDICAL IMAGING SYSTEM FOR SEGEMENTING BLOOD VESSEL

FIELD OF INVENTION

The embodiments herein generally relate to medical imaging systems, and, more particularly, to a medical imaging system for segmenting blood vessels on a basis of saptiotemporal metric from electro-cardiograph data input.

BACKGROUND OF INVENTION

Medical images represent various parts of the human body like blood vessels, bones, etc. By analyzing the medical images clinicians can plan treatment for the patients and at the same time, the clinicians can be guided to operate the body part while operating over the body part, for example catheter guidance, image guidance for the surgery. The medical images for surgery guidance are analyzed by registering the medical image with pre-operative 3D medical data. During the registration, the blood vessels represented by the medical images are used as features, which further requires segmentation of the blood vessels in real-time. Currently, segmentation of the blood vessels is done manually by clinicians which involves manual input of multiple points along the blood vessel direction to get blood vessel parameters like diameter and stenoses detection. Such manual segmentations have reduced efficiency of clinicians, mis-detection of blood vessels, etc. Manual segmentation is slow and prone to human errors, thus automatic segmentation of the blood vessels is desired.

One probable way is disclosed by Matthias Schneider and Hari Sundar in "Automatic global vessel segmentation and catheter removal using local geometry information and vector field integration", where local probability map is combined with local directional vessel information to result into global vessel segmentation, where the segmentation is represented as a set of discrete streamlines populating the vascular structures and providing additional connectivity and geometric shape information and the streamlines are computed by numerical integration of the directional vector field that is obtained from eigen analysis of the local Hessian indicating the local vessel direction.

SUMMARY OF THE INVENTION

In view of the foregoing, an embodiment herein includes a system to segment an original blood vessel of a body part represented by an original medical image comprising an image analyzer adapted to receive the original medical image for analyzing the original medical image to provide a Hessian Eigen analysis comprising a first data and a second data mapped to each pixel of the medical image, and an image identifier adapted to identify seed points from the pixels by processing the first data and the second data along with a vesselness property, wherein the seed points are used for segmenting the original blood vessel to provide a corrected medical image representing a corrected blood vessel.

In accordance with another aspect of the invention, the system includes a directional vector integrator for integrating the first data mapped to each pixel of the original medical image to provide a directional vector, an end detector for identifying ends of the original blood vessel using the vesselness property and the directional vector, a blood vessel generator for generating a first level pruned blood vessels by using the vesselness property, the directional vector for every seed and the ends detected by the end detector, a length and density map generator for generating a length and density map using the first level pruned blood vessels generated from the blood vessel generator, such that the length and density map comprises information of the pixels on the first level pruned blood vessels regarding a length of the first level pruned blood vessel and number of first level pruned blood vessels passing through the pixel, a centerline generator module for generating a centerline by using the length and density map, and a image generator adapted to generate a partially pruned medical image representing a second level pruned blood vessel by extracting second level pruned blood vessels by using the centerline.

According to another aspect, the system further includes a set identifier for receiving a series of the partially pruned images representing the second level pruned blood vessels at different location during different time interval of a physiological cycle of a body part and to identify a set of the partially pruned medical images in same phase of the body part movement cycle, and an image comparator for comparing every partially pruned medical images in the set with each other and to provide a corrected medical image representing corrected blood vessel on a basis of said comparison.

BRIEF DESCRIPTION OF THE DRAWINGS

The present invention is further described hereinafter with reference to exemplary embodiments shown in the accompanying drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
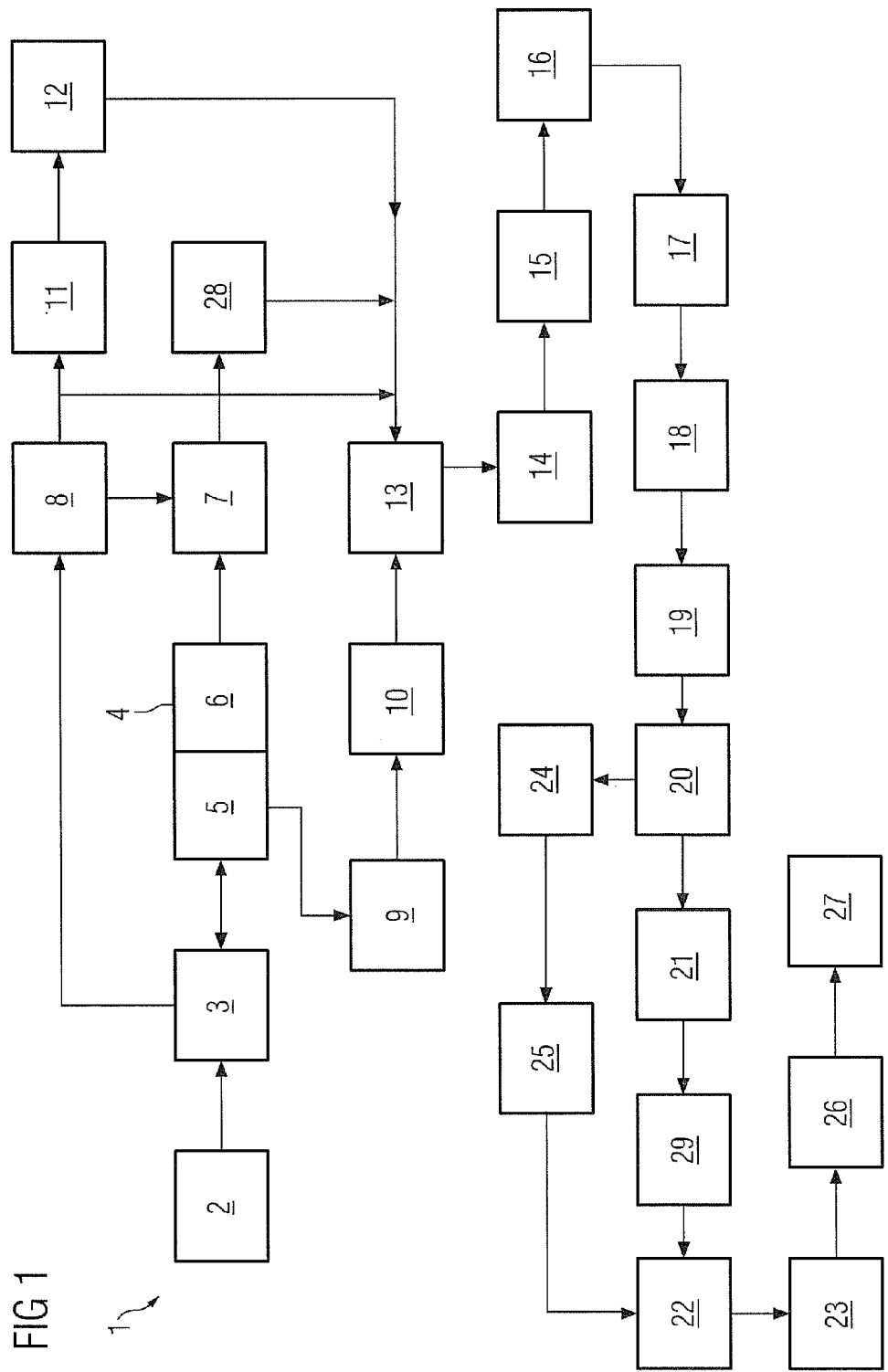
FIG. 1 illustrates a schematic diagram of an exemplary medical imaging system in accordance with an embodiment herein.

FIG. 1 illustrates a schematic diagram of a system 1 to segment an original blood vessel of a body part represented by an original medical image 2 in accordance with an embodiment herein. As illustrated, the system 1 includes an image analyzer 3 which receives the original medical image 2 for analyzing the image 2 to provide a Hessian Eigen analysis 4 comprising a first data 5 and a second data 6 mapped to each pixel of the medical image 2, and an image identifier 7 which identifies seed points 28 from the pixels by processing the first data 5 and the second data 6 along with a vesselness property 8, wherein the seed points 28 are used for segmenting the original blood vessel to provide a corrected medical image 23 comprising a corrected blood vessel.

On convolution of the original medical image 2 with partial second order derivative of Gaussian kernel, the Hessian Egien analysis 4 is generated. The Hessian Eigen analysis 4 has following characteristics:

small curvature along tube direction
large curvature along perpendicular direction This translates to small value of first eigen value λ1 and first eigenvector v1 in the direction of the tubular structure and larger value of second eigen value λ2 with the eigen vector v2 perpendicular to the tubular structure, wherein the first eigen value λ1 and first eigenvector v1 together represents the first data 5, and the second eigen value λ2 with the eigen vector v2 represents the second data 6. The first data 5 and second data 6 together represent the Hessian Eigen analysis 4.

In an alternate embodiment, the image identifier 7 identify the seed points 28 from the pixels by processing the first data 5 and the second data 6 by threshold the first data 5 and the second data 6 along with the vesselness property 8.

The original image 2 adapted to analyze the medical image to generate the vesselness property 8 using the Hessian Eigen analysis 4. In an alternate embodiment, the vesselness property 8 can be generated by any other algorithm independent to the system 1.

The system 1 further includes a directional vector integrator 9, an end detector 11, a blood vessel generator 13, a blood vessel generation module, a length and density map generator 15, a centerline generator 17 and a image generator 19, which cooperates together to produce a partially pruned medical image 20 every seeds 28 identified by the image identifier. The directional vector integrator 9 integrates the first data 5 mapped to each pixel of the original medical image 2 to provide a directional vector 10 which are used by the blood vessel generator 13 to generate a first level pruned blood vessel 14 in a direction referred by the directional vector 10. The end detector 11 identifies ends 12 of the original blood vessel using the vesselness property 8 and the directional vector 10, so that by using these ends 12 the blood vessel generator 13 will stop generating the first level pruned blood vessels 14 at these ends 12. The blood vessel generator 13 generates the first level pruned blood vessels 14 by using the vesselness property 8, the directional vector 10 for every seed 28 and the ends 12 detected by the end detector 11. The vesselness property 8 provides input for geometry and shape of the corrected blood vessel at each seed 28. The length and density map generator 15 generates a length and density map 16 using the first level pruned blood vessel 14 generated from the blood vessel generator 13, such that the length and density map 16 includes information of the pixels of the first level pruned blood vessel 14 regarding a length of the first level pruned blood vessel 14 and number of first level pruned blood vessels 14 passing through the pixel. The centerline generator 17 generates a centerline generator 18 by using the length and density map 16, wherein the centerline generator 18 extracts the second level blood vessel on a basis of the length and density map 16 to generate the partially pruned medical image 20 representing the second level pruned blood vessel using the image generator 19. In an alternate embodiment, the length and density map 16 includes information of the pixels on the first level pruned blood vessels 14 regarding length of the longest blood vessel. Yet alternatively, the length and density map generator 15 may includes information of any other significant vessels, or any critical vessel, or all the vessels.

The second level pruned blood vessels generated are still crude and have noise in respect to the original blood vessels from the original image 2. So, to reduce the noise, the system 1 further includes a set identifier 21 which receives a series of the partially pruned medical images 20 representing the second level pruned blood vessel at different location during different time interval of a physiological cycle of the body part and identifies a set 21 of the partially pruned medical images 20 in same phase of the body part movement cycle, and an image comparator 22 which compares every partially pruned medical images 20 in the set 21 with each other and to provide a corrected image representing a corrected blood vessel on a basis of said comparison. The original blood vessel represented in this embodiment is a coronary artery and the physiological cycle is a heart beat cycle. In an alternate embodiment, the original blood vessel may represent from lungs or kidney or any such body parts and the physiological cycle can be related to such body parts to which the original blood vessels belongs to.

The system 1 also includes a blood vessel distance transform generator 24 which generates a blood vessel distance transform map 25 for each partially pruned medical image 20 in the set 21, wherein the image comparator 22 compares every partially pruned medical images 20 in the set 21 with each other by superimposing the second level pruned blood vessels in each of the partially pruned medical images 20 of the set 21 onto the blood vessel distance transform map 25 of each of the partially pruned medical image 20. The image comparator 22 superimposes the second level pruned blood vessels in each of the partially pruned medical images 20 of the set 21 onto the blood vessel distance transform map 25 of each of the corrected image by calculation a distance on summing values represented on the blood vessel distance transform map 25 and the image comparator 22 outputs the corrected medical image 23 representing the corrected blood vessel if the distance is greater than a maximum value.

To analyze the corrected medical image 23 more effectively, a color marker 36 for color-coding is provided as a part of the system 1 to color code the corrected blood vessels represented by the corrected medical images 23 to provide a color coded blood vessels 27.

Figure 2:
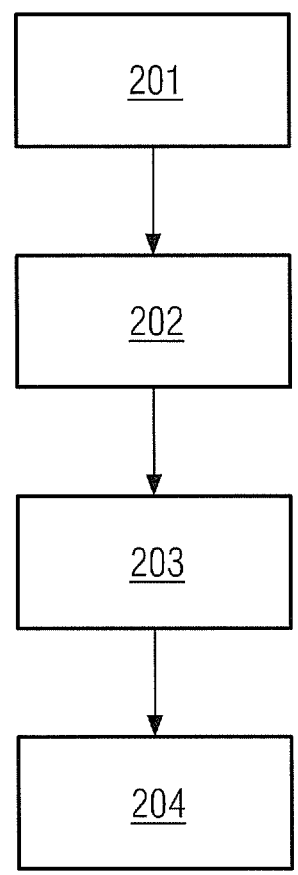
FIG. 2 illustrates an exemplary workflow according to an embodiment, wherein a set identifier processes partially pruned medical images to group the images into a set of partially pruned medical images in similar phase of physiological cycle.

An exemplary workflow for processing the partially pruned images by a set identifier to group partially pruned medical images into a set of partially pruned medical images in similar phase of physiological cycle is illustrated in FIG. 2. In step 201, information about ECG signals for a series of partially pruned images is extracted from a patient data file, wherein the series of the partially pruned medical images represents the second level pruned blood vessels at different location during different time interval of a physiological cycle of a body part. In step 202, peaks of the ECG signals are detected by using a limit which is determined adaptively, by finding the maxima and minima of the ECG signal. In step 203, phases are assigned based on specific location in a complete physiological cycle. For the processing purposes by the identifier only the partially pruned medical images lying between the complete physiological cycle is being considered and not the partially pruned medical image during the starting or ending of the physiological cycle. In step 204, the partially pruned medical images are grouped on a basis of similarity of phases. In a case, when the angiography based original medical images are used, the acquisition rate of the original medical images is much lower that the ECG signal data rate and the original medical images are not available at all the time instants, but only at discrete intervals. For two partially pruned medical images to be iso-phase, we fix a threshold Δ<(1/FPS), FPS is the acquisition rate of the original medical images. Hence criterion for detecting the iso-phase partially pruned medical images is:

$$(\theta 1 - \theta 2) < \Delta$$

where, θ1 and θ2 are the phases of two partially pruned medical images

In general, the numbers of groups are determined by the relationship below:

$$N = FPS * TR\text{-}R \pm 1$$

TR–R is the time interval between two physiological peaks.

Figure 3:
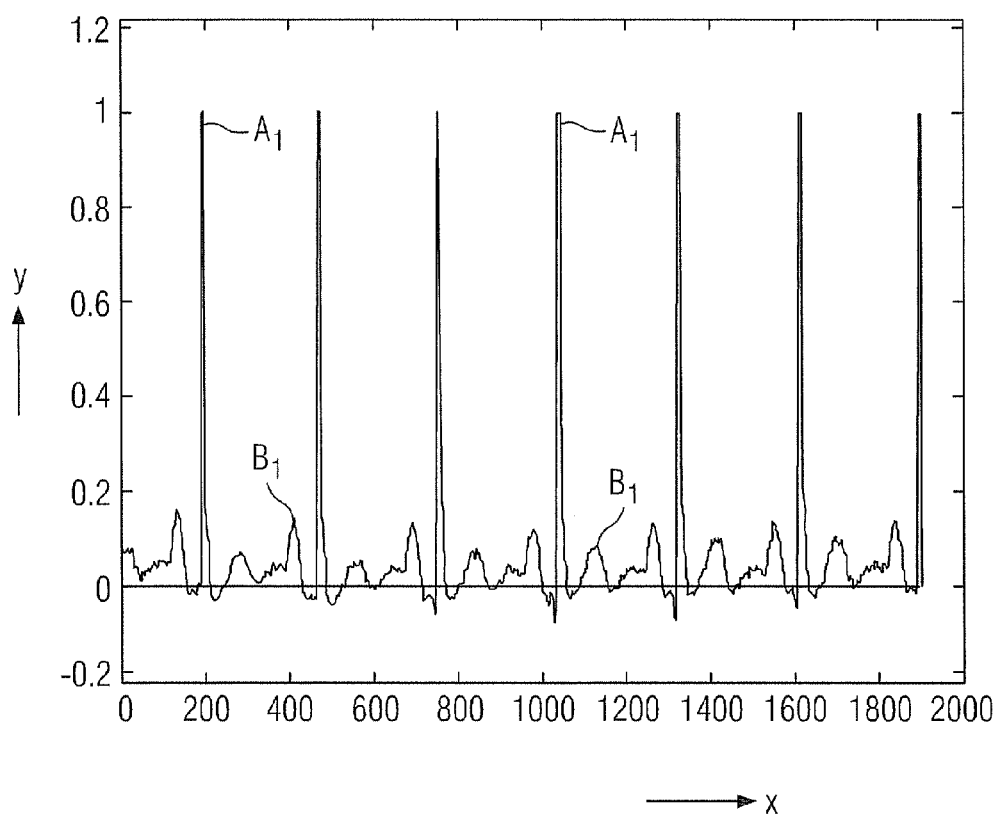
FIG. 3 illustrates a graphical representation of ECG signals against time with ECG peaks being identified.
Figure 4:
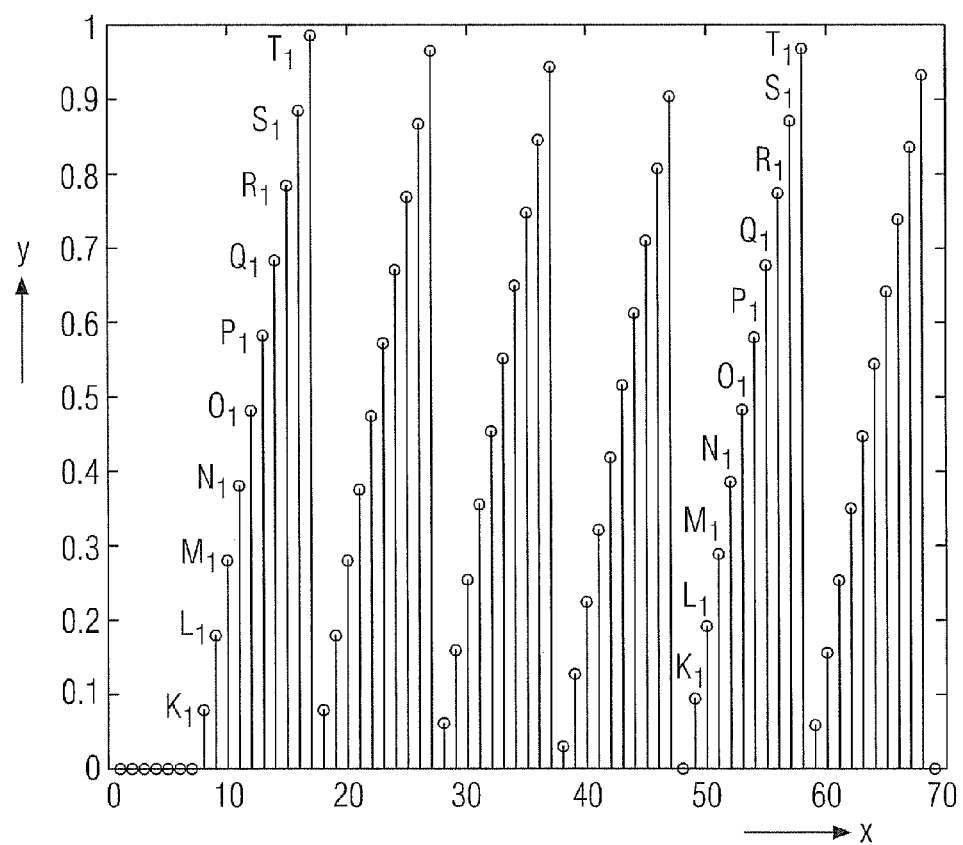
FIG. 4 illustrates a graphical representation of plotting of number of partially pruned medical images against phases of physiological cycle to identify a set of partially pruned medical images in same phases of physiological cycle.

To further explain FIG. 2, FIG. 3 and FIG. 4 together can be discussed in reference to FIG. 2, wherein the references from FIG. 1 and FIG. 2 are used while discussing the aspects of FIG. 3 and FIG. 4.

FIG. 3 illustrates a graphical representation of ECG signals against time with ECG peaks being identified according to the workflow of step 202 in FIG. 2. On x-axis time is shown which represents time period of acquisition of series of original images 2 during the physiological cycles of a body part. While, on y axis data relating to the ECG signal is provided. The plotting of ECG signals and the time is represented by a curve $B_1$. The peaks of the ECG are identified by the set identifier 21 by using a limit which is determined adaptively, by finding the maxima and minima of the ECG signal and the peaks identified are marked on the graph as $A_1$.

FIG. 4 illustrates a graphical representation of plotting of number of partially pruned medical images 20 in a series against phases of physiological cycle when the series of partially pruned medical images 20 have been captured to identify a set 21 of partially pruned medical image 20 in same phases of physiological cycle by the set identifier 21 as explained in the workflow of FIG. 2 in step 204. The x-axis represents the numberings of the partially pruned medical images 20 and the y-axis represents the phases of the physiological cycles. In the graphical representation, the partially pruned medical images 20 of the series are numbered through $K_1$ through $T_1$, according to which group out of $K_1$ through $T_1$ the partially pruned medical images 20 belongs, wherein $K_1$ through $T_1$ represents groups of partially pruned medical images 20 in similar phase of the physiological cycle.

What is claimed is:

1. A medical imaging system for segmenting an original blood vessel of a body part represented by an original medical image, comprising:
   an image analyzer adapted to receive and analyze the original medical image for providing a Hessian Eigen analysis comprising a first data and a second data mapped to each pixel of the original medical image;
   an image identifier adapted to receive the Hessian Eigen analysis for identifying seed points from the pixel by processing the first data and the second data along with a vesselness property;
   a directional vector integrator adapted to integrate the first data mapped to the each pixel of the original medical image to provide a directional vector;
   an end detector adapted to identify ends of the original blood vessel using the vesselness property and the directional vector;
   a blood vessel generator adapted to generate first level pruned blood vessels by using the vesselness property, the directional vector, and the ends detected by the end detector;
   a length and density map generator adapted to generate a length and density map using the first level pruned blood vessels, the length and density map comprising a length of the first level pruned blood vessels and number of the first level pruned blood vessels passing through pixels on the first level pruned blood vessels;
   a centerline generator module adapted to generate a centerline by using the length and density map;
   an image generator adapted to generate a partially pruned medical image representing second level pruned blood vessels by using the centerline;
   a set identifier adapted to receive a series of the partially pruned medical image at different locations during different time intervals of a physiological cycle of the body part and to identify a set of the partially pruned medical images in a same phase of the physiological cycle of the body part; and
   an image comparator adapted to compare the partially pruned medical images in the set with each other and to provide the corrected medical image representing the corrected blood vessel based on the comparison,
   wherein the seed points are used for segmenting the original blood vessel to provide a corrected medical image representing a corrected blood vessel.

2. The system according to claim 1, wherein the image identifier processes the first data and the second data by threshold the first data and the second data along with the vesselness property.

3. The system according to claim 1, wherein the image analyzer is adapted to analyze the original medical image to generate the vesselness property using the Hessian Eigen analysis.

4. The system according to the claim 1, wherein the original blood vessel is a coronary artery and the physiological cycle is a heart beat cycle.

5. The system according to the claim 1, further comprising:
   a blood vessel distance transform generator adapted to generate a blood vessel distance transform map for each of the partially pruned medical images in the set, wherein the image comparator is adapted to compare the partially pruned medical images in the set with each other by superimposing the second level pruned blood vessels in the set of the partially pruned medical images onto the blood vessel distance transform map.

6. The system according to the claim 5, wherein the image comparator is adapted to calculate a distance on summing values represented on the blood vessel distance transform map for superimposing the second level pruned blood vessels in the set of the partially pruned medical images onto the blood vessel distance transform map and to output the corrected medical image representing the corrected blood vessel if the distance is greater than a maximum value.

7. The system according to claim 1, further comprising a color marker adapted to provide color coded blood vessels by marking the corrected blood vessel distinctively using various colors.

8. A method for segmenting an original blood vessel of a body part represented by an original medical image, comprising:
   receiving and analyzing the original medical image by an image analyzer for providing a Hessian Eigen analysis comprising a first data and a second data mapped to each pixel of the medical image;
   receiving the Hessian Eigen analysis and identifying seed points from the pixel by processing the first data and the second data along with a vesselness property by an image identifier;
   integrating the first data mapped to the each pixel of the original medical image to provide a directional vector by a directional vector integrator;

identifying ends of the original blood vessel using the vesselness property and the directional vector by an end detector;
generating first level pruned blood vessels by using the vesselness property, the directional vector, and the ends detected by a blood vessel generator;
generating a length and density map using the first level pruned blood vessels by the blood vessel generator, the length and density map comprising a length of the first level pruned blood vessel and number of the first level pruned blood vessels passing through pixels on the first level pruned blood vessels,
generating a centerline by a centerline generator using the length and density map;
generating a partially pruned medical image by an image generator for extracting second level pruned blood vessels using the centerline;
receiving a series of the partially pruned medical images representing the second level pruned blood vessels at different locations during different time intervals of a physiological cycle of a body part by a set identifier;
identifying a set of the partially pruned medical images in a same phase of the physiological cycle of the body part by the set identifier,
comparing the partially pruned medical images in the set with each other by an image comparator; and
providing the corrected medical images rep resenting the corrected blood vessel based on the comparison by the image comparator,
wherein the seed points are used for segmenting the original blood vessel to provide a corrected medical image representing a corrected blood vessel 9. The method according to claim 8, wherein the first data and the second data is processed by threshold the first data and the second data along with the vesselness property.

10. The method according to claim 8, further comprising analyzing the original medical image to generate the vesselness property using the Hessian Eigen analysis by the image analyzer.

11. The method according to claim 8, wherein the original blood vessel is a coronary artery and the physiological cycle is a heart beat cycle.

12. The method according to claim 8, further comprising:
generating a blood vessel distance transform map for each of the partially pruned medical images in the set by a blood vessel distance transform generator,
wherein the partially pruned medical images in the set are compared with each other by superimposing the second level pruned blood vessels in the set of the partially pruned medical images onto the blood vessel distance transform map.

13. The method according to claim 12, wherein the second level pruned blood vessels in the set of the partially pruned medical images is superimposed onto the blood vessel distance transform map by calculating a distance on summing values represented on the blood vessel distance transform map and the corrected medical image representing the corrected blood vessel is output if the distance is greater than a maximum value.

14. The method according to claim 8, further comprising marking the corrected blood vessel distinctively using a color code by a color marker to provide color coded blood vessels.

* * * * *